United States Patent
Kim et al.

(10) Patent No.: US 8,189,610 B2
(45) Date of Patent: May 29, 2012

(54) RESOURCE MANAGEMENT AND RECURSIVE PATH COMPUTATION FOR REAL-TIME AUTOMATIC PATH SETUP AT MULTI-LAYER TRANSPORT NETWORK

(75) Inventors: Sun Me Kim, Daejeon (KR); Bup Joong Kim, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 12/582,333

(22) Filed: Oct. 20, 2009

(65) Prior Publication Data

US 2010/0158035 A1    Jun. 24, 2010

(30) Foreign Application Priority Data

Dec. 19, 2008  (KR) .......................... 10-2008-0130708

(51) Int. Cl.
*H04J 3/16* (2006.01)
(52) U.S. Cl. .......................... 370/437; 370/238; 370/469
(58) Field of Classification Search .......................... None
See application file for complete search history.

(56) References Cited

U.S. PATENT DOCUMENTS

| 2002/0097747 A1 | 7/2002 | Kirkby et al. |
| 2007/0038734 A1* | 2/2007 | Grammel ...................... 709/223 |
| 2008/0075011 A1* | 3/2008 | Mack-Crane et al. ........ 370/238 |

FOREIGN PATENT DOCUMENTS

| EP | 1 755 286 A1 | 2/2007 |
| JP | 2004-260231 | 9/2004 |
| KR | 10-2004-0028396 | 4/2004 |
| KR | 10-2005-0080703 | 8/2005 |

OTHER PUBLICATIONS

Japanese Office Action issued Dec. 20, 2010 in corresponding Japanese Patent Application 2009-178279.

* cited by examiner

*Primary Examiner* — Ricky Ngo
*Assistant Examiner* — David Oveissi
(74) *Attorney, Agent, or Firm* — Staas & Halsey LLP (57) ABSTRACT

A recursive path computation method is disclosed to integratedly manage resources required for a computation of a data transmission path in a multi-layer transport network to enable automatic real time allocation of lower layer resources required for processing a path request when resources required for a path computation of each layer are not sufficient or when resources have not been previously allocated. A network path request service over multiple layers can be quickly performed, and utilization efficiency of network resources can be maximized.

18 Claims, 7 Drawing Sheets

| Layer | Origination address | Link address | Destination address | Link address | Band | Metric | Others |
|---|---|---|---|---|---|---|---|
| U | U1 |  |  |  |  | 3 |  |
| U | U2 |  | 31 |  |  | 2 |  |
| U | U3 |  |  |  |  | 3 |  |
| U | U1 | TE1 | U2 | TE1 | BW1 |  |  |

| Layer | Origination address | Link address | Destination address | Link address | Band | Metric | Others |
|---|---|---|---|---|---|---|---|
| M | M1 |  |  |  |  | 3 |  |
| M | M3 |  |  |  |  | 3 |  |
| M | M4 |  | 32 |  |  | 1 |  |
| M | M2 |  |  |  |  | 2 |  |
| M | M1 | TE1 | M3 | TE1 | BW5 |  |  |
| M | M3 | TE2 | M2 | TE1 | BW6 |  |  |
| M | M4 | TE1 | M2 | TE2 | BW7 |  |  |

| Layer | Origination address | Link address | Destination address | Link address | Band | Metric | Others |
|---|---|---|---|---|---|---|---|
| L | L1 |  |  |  |  | 3 |  |
| L | L2 |  |  |  |  | 3 |  |
| L | L3 |  | 33 |  |  | 2 |  |
| L | L4 |  |  |  |  | 1 |  |
| L | L5 |  |  |  |  | 4 |  |
| L | L1 | TE1 | L4 | TE1 | BW1 |  |  |
| L | L4 | TE2 | L2 | TE1 | BW2 |  |  |
| L | L1 | TE2 | L3 | TE1 | BW3 |  |  |
| L | L3 | TE2 | L4 | TE3 | BW4 |  |  |
| L | L3 | TE3 | L5 | TE1 | BW5 |  |  |
| L | L4 | TE5 | L5 | TE2 | BW6 |  |  |
| L | L5 | TE3 | L2 | TE2 | BW7 |  |  |

<40>

| Layer | Origination address | Link address | Destination address | Link address | Band | Metric | Others |
|---|---|---|---|---|---|---|---|
| L | N1 |  |  |  |  | 3 |  |
| M | N1 |  |  |  |  | 3 |  |
| U | N1 |  |  |  |  | 3 |  |
| L | N2 |  |  |  |  | 2 |  |
| M | N2 |  |  |  |  | 2 |  |
| U | N2 |  | 41 |  |  | 2 |  |
| L | N3 |  |  |  |  | 3 |  |
| M | N3 |  |  |  |  | 3 |  |
| U | N3 |  |  |  |  | 3 |  |
| L | N4 |  |  |  |  | 1 |  |
| M | N4 |  |  |  |  | 1 |  |
| L | N5 |  |  |  |  | 4 |  |
| U | U1 | TE1 | U2 | TE1 | BW1 |  |  |
| M | M1 | TE1 | M3 | TE1 | BW5 |  |  |
| M | M3 | TE2 | M2 | TE1 | BW6 |  |  |
| M | M4 | TE1 | M2 | TE2 | BW7 |  |  |
| L | L1 | TE1 | L4 | TE1 | BW1 |  |  |
| L | L4 | TE2 | L2 | TE1 | BW2 |  |  |
| L | L1 | TE2 | L3 | TE1 | BW3 |  |  |
| L | L3 | TE2 | L4 | TE3 | BW4 |  |  |
| L | L3 | TE3 | L5 | TE1 | BW5 |  |  |
| L | L4 | TE5 | L5 | TE2 | BW6 |  |  |
| L | L5 | TE3 | L2 | TE2 | BW7 |  |  |

RESOURCE MANAGEMENT AND RECURSIVE PATH COMPUTATION FOR REAL-TIME AUTOMATIC PATH SETUP AT MULTI-LAYER TRANSPORT NETWORK

CROSS-REFERENCE TO RELATED APPLICATION

This non-provisional application claims priority under 35 U.S.C. §119(a) of Korean Patent Application No. 2008-0130708, filed on Dec. 19, 2008, the entire contents of which are hereby incorporated by reference.

BACKGROUND OF THE INVENTION

1. Field of the Invention

The present invention relates to a recursive path computation method capable of automatically allocating lower layer resources to process a path request when resources required for path computation by layers is not sufficient or have not previously allocated by collectively or integratedly managing resources required for computing a data transmission path in a multi-layer transport network.

2. Description of the Related Art

A multi-layer transport network is a network including networks such as light, TDM, Ethernet, and the like, and diverse equipments each having a different data transmission scheme and switching capacity. Those equipments constituting the multi-layer transport network may provide transmission resources of multiple layers and perform inter-layer switching in data transmission.

In order to provide a transmission service, the related art multi-layer transport network manages resources by layers. Namely, each management and control system is provided for each layer, and a transmission service is separately operated by each operating subject.

However, recently, as the market demand for a light/packet integrated transport network is increasing and development of relevant equipments is actively ongoing, an integrated resource management function different from those conventional techniques is required. Namely, as light/packet transmission layer-integrated equipments are put on the market, a method for computing a path for a transmission service is required in the multi-layer resource network using an integrated equipment.

In the related art path computation method of the multi-layer transport network, resources required for each layer are predicted in advance and allocated to each layer to establish a requested packet or light/TDM transmission path. For example, resources required for a path computation are allocated in units of lambda in each layer, which are then managed by a traffic engineering (TE) link. Thus, in the related art, when a path computation request for a transmission service of each layer is received, a path is computed by layers by utilizing the already allocated TE link resources.

The related art management method, however, has a problem in that if the TE link resources previously allocated by layers are not sufficient, an operator should additionally set a required resource for a corresponding layer. In addition, a situation in which one layer is in short of resources because of congested path requests while another layer does not have a path request only to result in a waste of the previously allocated resources is inevitable. Thus, the related art has a limitation in real-time computation of paths or in utilizing resources required for path computation.

SUMMARY OF THE INVENTION

An object of the present invention is to prevent the occurrence of a failure of path computation due to a shortage of a resource in a certain layer in case where a network operator manually sets resources required for path computation for a transmission service by layers.

Another object of the present invention is to allow a resource of another layer to be automatically used if a resource of one layer for which path computation has been requested is not sufficient, to thus maximize resource efficiency of a multi-layer transport network and enable fast path computation.

To achieve the above object, when resources required for path computation for a transmission service are managed, information regarding switching capability of respective layers of a node as well as traffic engineering (TE) link state information with respect to transmission resources of the layers. In addition, collecting and managing of resource information of the layers are integrated. Accordingly, if a certain layer is short of a link resource in the path computation process, a path can be recursively computed down to the lowermost layer without an operator intervention.

In other words, when the link resource of the certain layer is not sufficient, it is not determined as a path establishment failure, and a path computation between lower layer nodes is automatically performed through a node having an inter-layer switching capability. That is, an improved resource management method and path computation method are provided to compute a path required for a transmission service by using a link resource of a lower layer when a link resource of a certain layer is insufficient.

According to an aspect of the present invention, there is provided a method for computing a recursive path in a multi-layer transport network, including: receiving a path computation request for a transmission service of an N layer in the multi-layer transport network including at least two layers; searching a traffic engineering (TE) link resource available in an N−1 layer and computing a path of the TE link available section when the TE link resource of the N layer required for computing the computation-requested path is insufficient; and requesting computation of a path using inter-layer switching available nodes present in a TE link unavailable section of the N−1 layer as an origination node and a destination node when there is the TE link-unavailable section in the N−1 layer, wherein a path computation of a next lower layer and a path computation request are repeatedly conducted recursively until when all the path computations included in the N layer path computation request is completed.

According to another aspect of the present invention, there is provided an apparatus for recursive path computation in a multi-layer transport network including at least two layers, including: a TE database including ID information assigned to each node of the multi-layer transport network, information about switching capability of a node available for inter-layer switching, and information about a priority level assigned to the inter-layer switching-available node; and a path computation engine configured to search a TE link resource of the N layer with reference to the TE database when a path computation request for a transmission service of the N layer is received, and to recursively repeat a path computation of a next sub-layer and a path computation request until all the path computations included the N layer path computation request, if the searched TE link resource of the N layer is insufficient for the N layer path computation.

According to the present invention, resources required for layers are automatically allocated without operator's manual intervention or without a previous allocation of resources to the respective layers in the multi-layer transport network including multi-layer transport resources. Accordingly, required resources can be automatically allocated to a requested service at a desired time.

In addition, a practical scheme for effectively and quickly providing diverse services such as from a light/TDM dedicated line service to a VPN service via the multi-layer transmission resources can be provided.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Exemplary embodiments of the present invention will now be described in detail with reference to the accompanying drawings.

A method for computing a recursive path required for a path computation in a multi-layer transport network according to an embodiment of the present invention enables maximization of resource efficiency required for providing a transmission service and fast computation of a path for the transmission service. For this purpose, in the path computation method according to an embodiment of the present invention, network topology information including switching capability information of a node as well as link information with respect to network resources of respective layers is constructed. In the resource management method according to an embodiment of the present invention, transmission resources of respective layers are collectively and integratedly managed based on the constructed network topology information. Also, in the path computation method according to an embodiment of the present invention, when an N layer path is requested, a resource of a lower layer is automatically searched and a path in the lower layer is computed with reference to the integratedly managed resources.

Figure 1:
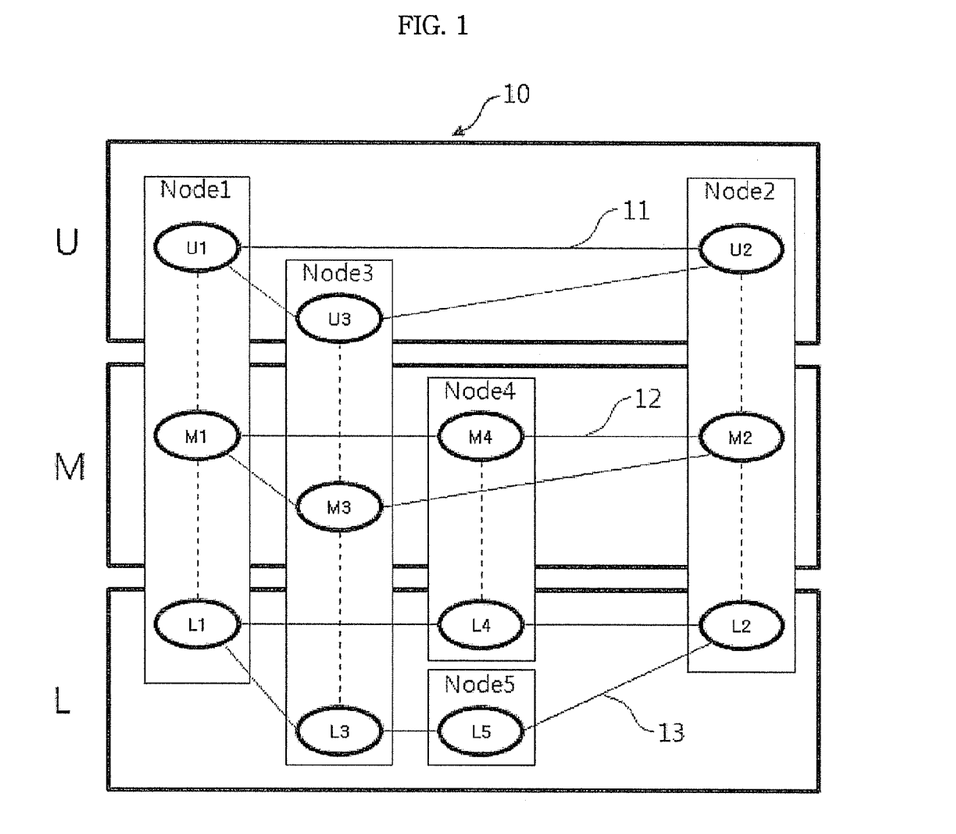
FIG. 1 illustrates the configuration of a multi-layer transport network according to an embodiment of the present invention.

FIG. 1 illustrates the configuration of a multi-layer transport network according to an embodiment of the present invention.

As illustrated, a multi-layer transport network 10 includes three layers L, M, and U. In this embodiment, the layers L, M, and U are networks providing transmission resources of different units. For example, the lower layer (L), the lowermost layer of the multi-layer transport network 10, is an optical transport network providing transmission resources in units of Lambda. The middle layer (M) is a TDM transport network providing transmission resources in units of TDM (SDH/SONET) unit, i.e., in units of time division. The upper layer (U), the uppermost layer of the multi-layer transport network, is a packet transport network providing packet transmission resources such as a PBB-TE or an MPLS-TP.

The transmission resources of the three layers are entirely or partially mounted in a single equipment to establish a network, and such network is called the multi-layer transport network. Each node in the multi-layer transport network may retain switching and controlling capability with respect to resources of a single layer or at least two layers. In the present exemplary embodiment, a node retaining the switching and controlling capability with respect to resources of at least two layers, among those in the multi-layer transport network, is called a node having an inter-layer switching capability.

As shown in FIG. 1, Nodes 1, 2, and 3 retain switching and controlling capability with respect to the resources of all the layers of the lower layer (L), the middle layer (M), and the upper layer (U). Node 4 retains the switching and controlling capability only with respect to the layers (L) and (M). Thus, the Nodes 1, 2, 3, and 4 can perform inter-layer switching. Node 5 retains the switching and controlling capability of transmission resources only for the layer (L). That is, Node 5 cannot perform inter-layer switching.

The Nodes 1 to 5 in the multi-layer transport network 10 form traffic engineering (TE) link resources connected with neighbor nodes in corresponding layers according to switching and controlling capability of the respective layers. As shown in FIG. 1, the Nodes 1, 2, and 3 can switch resources of the L, M, and U layers. That is, the Nodes 1, 2, and 3 are all able to form TE link resources with the neighbor nodes in the L, M, and U layers (11, 12, 13). The Node 4 is able to form TE link resources in the M layer with the neighbor nodes, namely, Nodes 1, 2, and 3, (12), and form TE link resources in the L layer with the Nodes, 1, 2, 3, and 5 (13). The Node 5 is able to form TE link resources only in the L layer (13). The link resources may be provided as a transmission path for a service requested by each layer or may be allocated as resources for a transmission path of an upper layer.

Figure 2:
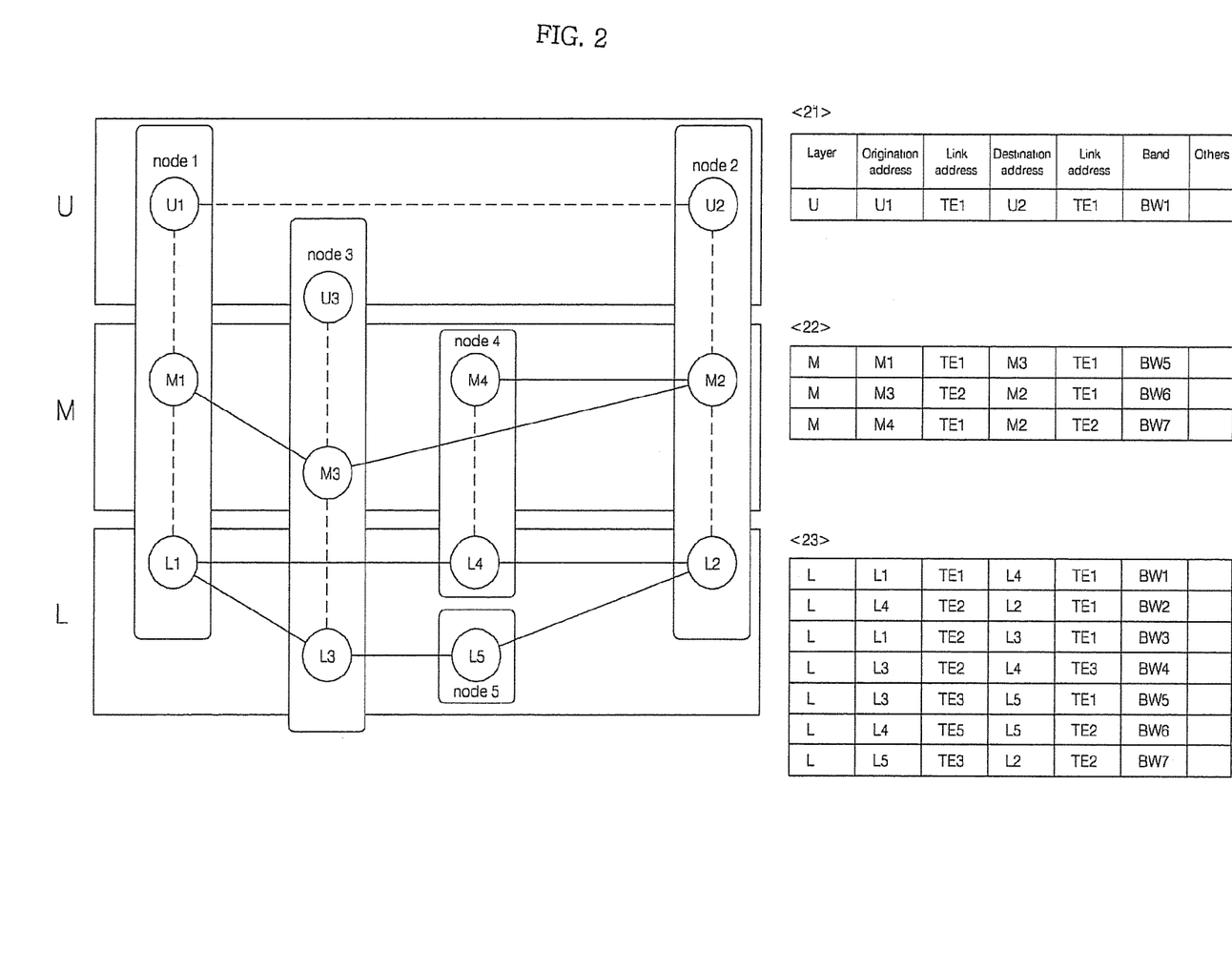
FIG. 2 illustrates an example of a traffic engineering (TE) database formed in a multi-layer transport network according to the related art.

FIG. 2 illustrates a TE database information of each layer constructed according to resource information and management procedure of the related art multi-layer transport network. In the related art resource management method, a node in the multi-layer transport network advertises link state information based on a TE link to a neighbor node in the network. The TE database receives the link state information transmitted from the node in the multi-layer transport network, and constructs a TE database based on band information switching capability, and other information based on links between nodes of each layer.

Accordingly, as shown in FIG. 2, a TE database 23 of the L layer is constructed with node ID information and link ID information of both sides indicating TE link topology-centered information of the L layer. A TE database 22 of the M layer is constructed with node ID information and link ID information of both sides indicating TE link topology-centered information set in the M layer. A TE database 21 of the U layer is constructed with node ID information and link ID information of both sides indicating TE link topology-centered information set in the U layer.

Based on the resource information constructed based on the link topology, if a link is not previously allocated as resources, or if a link has been allocated but a new transmission path request service is received in a state that link resources have been used up so they are not sufficient, a procedure for allocating new resources through a passive intervention by an operator is required. If the operator does not allocate new resources, a transmission path computation would fail. Then, a real time response to the transmission path request is not possible.

Figure 3:
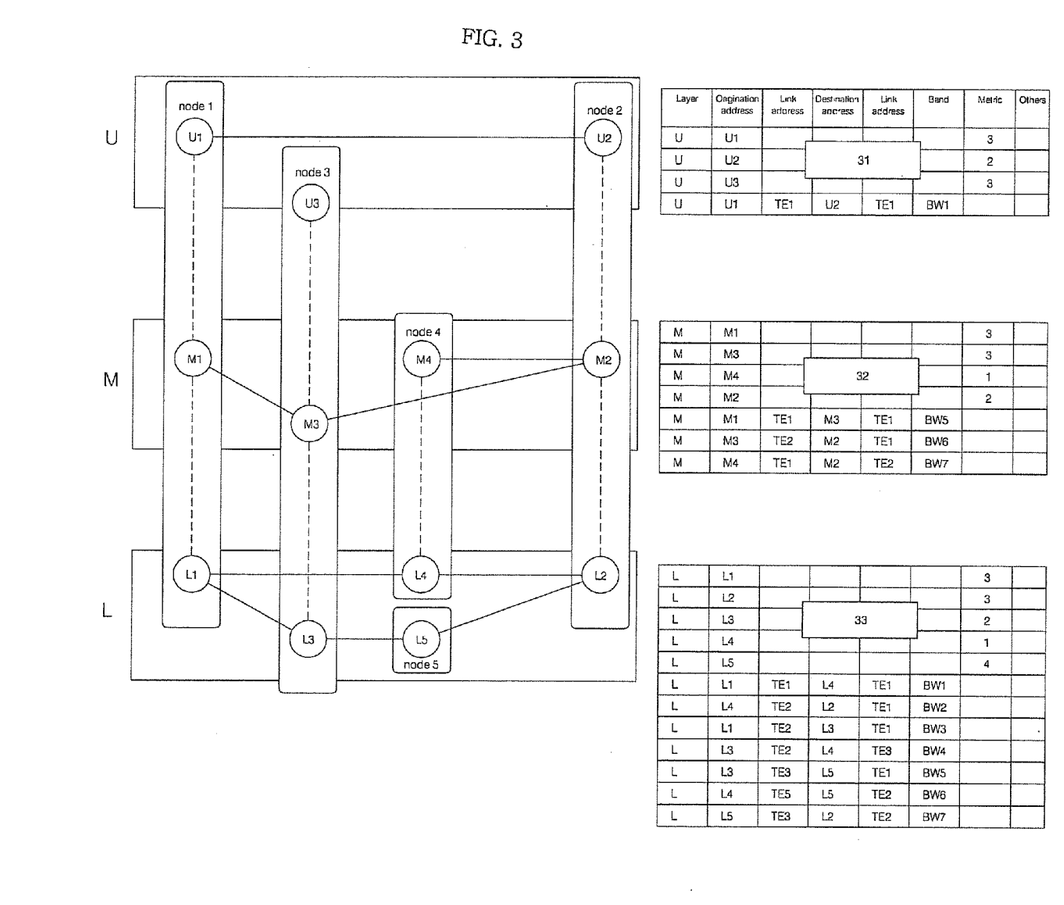
FIG. 3 illustrates an example of a TE database formed in a multi-layer transport network according to an embodiment of the present invention.

FIG. 3 illustrates a TE database information constructed through a method for managing resource information of each layer according to an embodiment of the present invention. The TE database is constructed by using information about switching capability and band related to a TE link established for each transmission layer that can be processed by each node, information indicating whether or not a node itself retains switching and controlling capability (PSC (Packet Switching Capability), L2SC (Layer 2 Switching Capability), TDMC (Time Division Multiplexing Switching Capability), LSC (Lambda Switching Capability), FSC (Fiber Switching Capability), etc.) of a corresponding layer, and a metric value corresponding to priority of a node.

Namely, as shown in FIG. 3, in the L layer, L1, L2, L3, L4, and L5 nodes have switching and controlling capability with respect to a transmission path of the L layer. In the M layer, M1, M2, M3, and M4 nodes have switching and controlling capability with respect to a transmission path of the M layer. In the U layer, only U1, U2, and U3 nodes have switching and controlling capability with respect to a transmission path of the U layer. Accordingly, the TE database according to an embodiment of the present invention is constructed by including the information 31, 32, and 33 regarding nodes having resource switching and control capability of the corresponding layers.

The information about the switching and controlling capability with respect to the transmission paths of the respective layers indicates retaining of potential ability for generating a TE link by automatically setting the paths of the corresponding layers by using a TE link of the lower layer. Thus, even if there is no TE link resources of the corresponding layer at the moment, a path can be computed and established through resources of the lower layer. The metric value corresponds to a priority value in selecting a node when a path is computed among several nodes.

Figure 4:
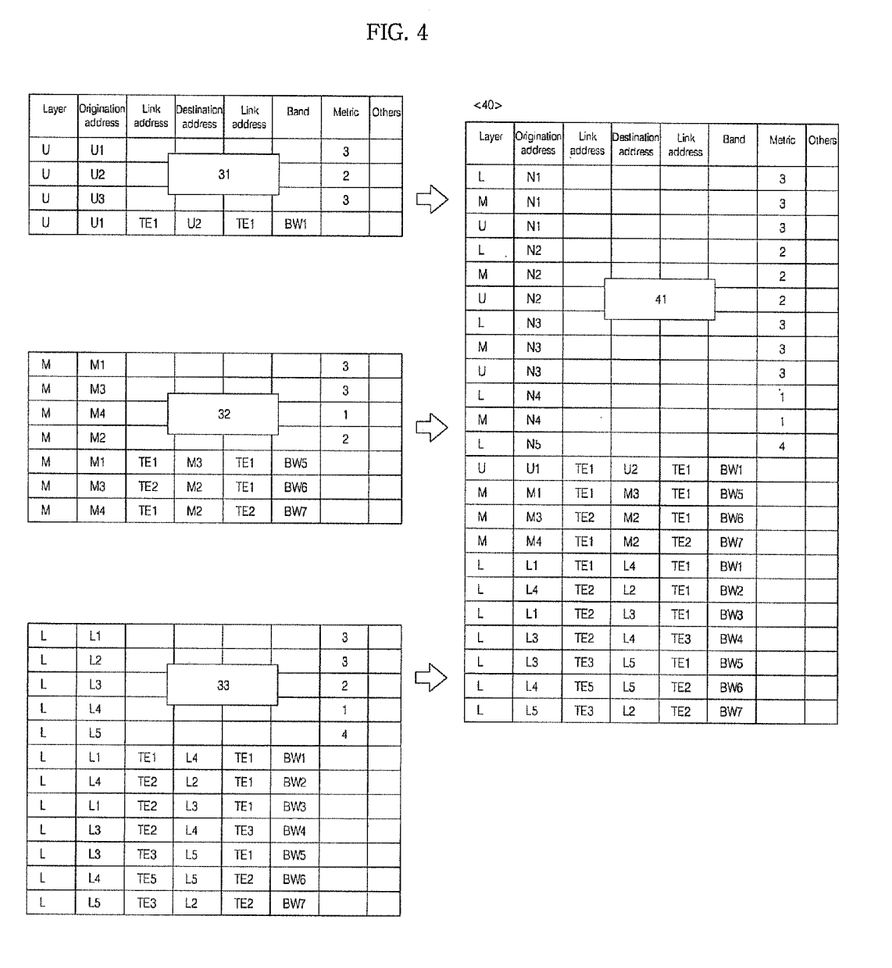
FIG. 4 illustrates an example of a multi-layer integrated network resource management TE database according to an embodiment of the present invention.

FIG. 4 illustrates a TE database 40 that collectively and integratedly managing information about switching and controlling capability of the nodes of each layer and links. The TE database 40 collectively manages information about each node and a TE link established between nodes to thus integratedly manage transmission resources of each layer. In this case, the same ID of the nodes of the respective layers may be used. In other words, among the nodes existing in each layer, inter-layer switching available nodes are assigned the same node ID for every switching available layer. Thus, a node that has switching and controlling capability with respect to transmission resources of several layers and manages a relevant TE link can be identified through its node ID.

As for a path computation engine, it is noted that, in the U layer, the N1, N2, and N3 nodes can switch and control transmission resources, in the M layer, the N1, N2, N3, and N4 nodes can switch and control transmission resources, and in the L layer, the N1, N2, N3, N4, and N5 nodes can switch and control transmission resources (41).

Namely, the path computation engine can recognize through the integrated type TE database 40 that the N1, N2, and N3 nodes have switching and controlling capability with respect to all the layers of L, M, and U regardless of a current presence of the TE link, N4 node has resource switching and controlling capability with respect to the two layers of L and M, and N5 node has resource switching and controlling capability with respect to only the L layer.

Figure 5:
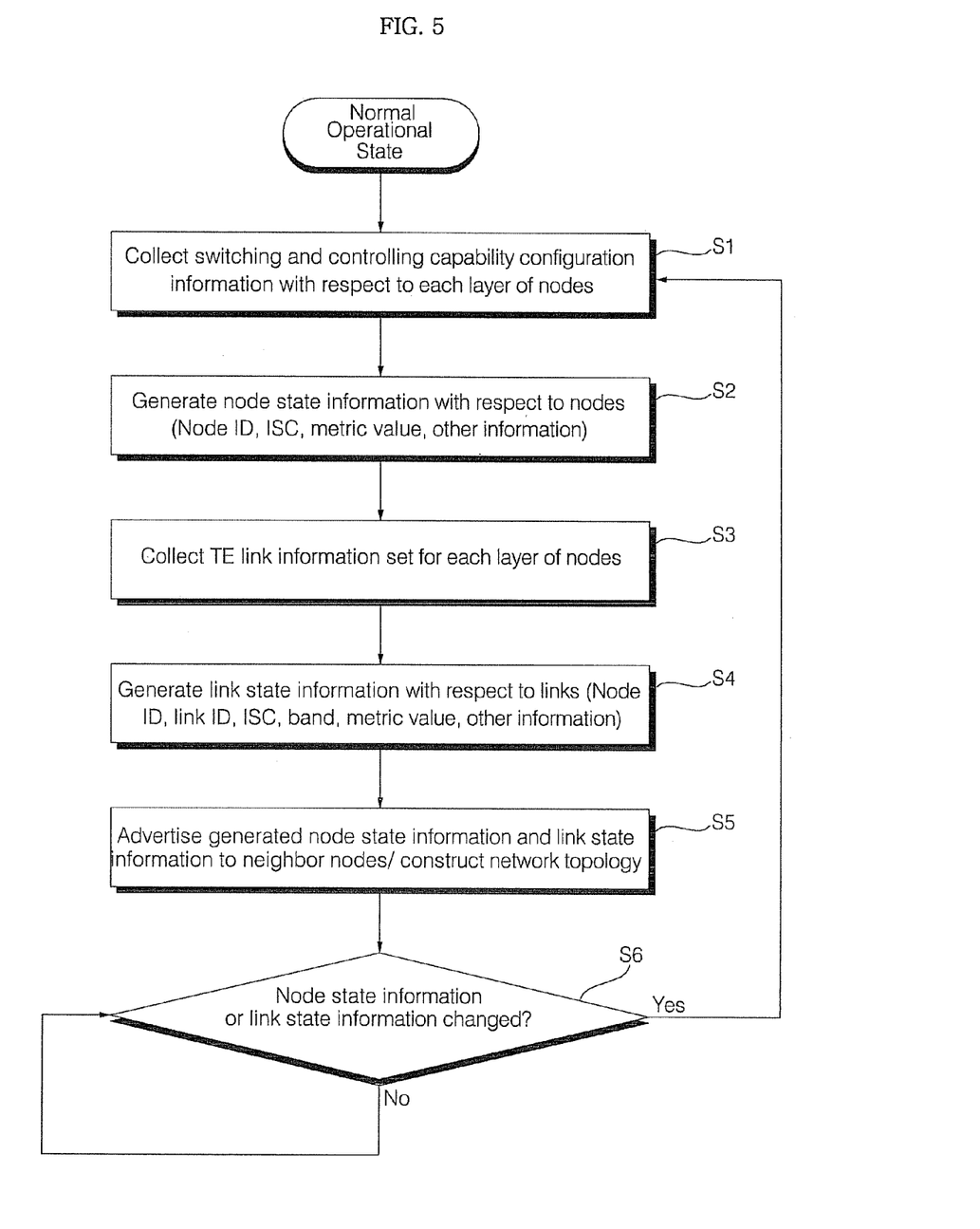
FIG. 5 is a flow chart illustrating the process of a method for configuring a network topology in the multi-layer transport network.

FIG. 5 is a flow chart illustrating the process of advertising, by each node, node information about switching and controlling capability of transmission resource and pre-set TE link information by layers to neighbor routing nodes.

Each node collects setup information about switching and controlling capability with respect to each transmission layer that can be processed by each corresponding node (S1). For example, each node may extract setup information about switching and controlling capability from configuration information set by the operator.

Each node generates node ID information, interface switching capability (ISC) information indicating switching capability of a corresponding node, and node state information including a metric value corresponding to priority of the node with respect to each transmission layer that can be switched and controlled, based on collected information (S2). The format of such information may be changed according to a type of a used routing protocol or a management protocol.

Each node collects TE link information established by layers (S3), and generates link state information with respect to a link based on TE link information confirmed by layers (S4). The link state information may include node ID information, link ID information, ISC information, band information allocated to other TE link, and required information different from a metric value of a link.

Each node advertises the thusly collected and generated node state information and link state information to neighbor routing nodes, to thus construct a topology with respect to nodes and links of the overall network (S5). The topology constructing process through the process of collecting/generating/advertising the node state information and link state information may be performed again when each node information is changed or the TE link information is changed (S6).

Figure 6:
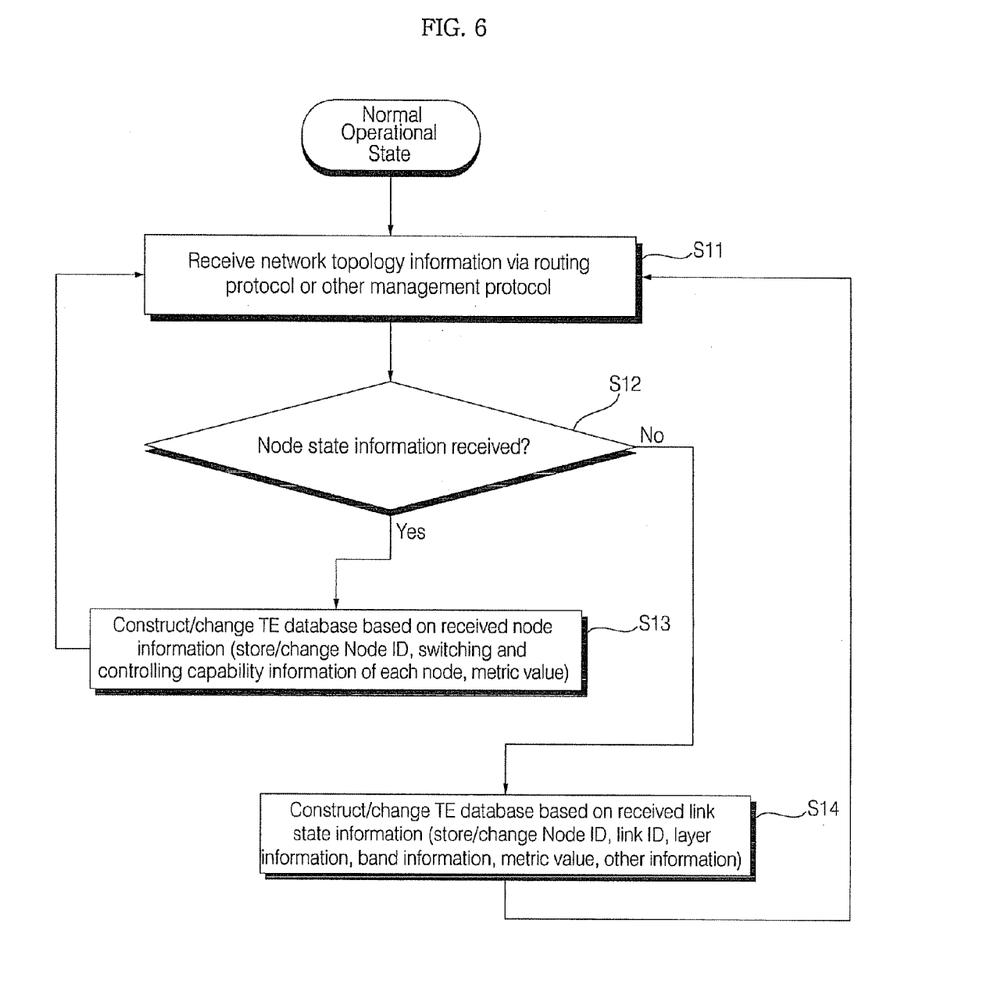
FIG. 6 is a flow chart illustrating the process of a method for forming a TE database by a path computation engine according to an embodiment of the present invention.

FIG. 6 is a flow chart illustrating the process of constructing, by the path computation engine, an integrated type TE database by using the node and link topology of the network collected through the routing protocol or any other management protocol. The system for constructing the TE database may be provided as a separate system or may exist together at each node.

The path computation engine receives information about nodes and links in the multi-layer transport network via the routing protocol or any other management protocol (S11). When the path computation engine receives node state information (S12), it constructs or changes a TE database by using node ID information, information about switching and controlling capability with respect to a particular layer of each node, and information about a metric value assigned to each node included in the node state information (S13).

When the path computation engine receives the link state information, it constructs or changes a TE database by using Node ID information of both sides of a link, link ID information, switching layer information, band information, metric value information and other TE link-related information (S14).

Namely, after the path computation engine constructs the TE database based on the node state information and the link state information, if the node state information and the link state information changes, the path computation engine continuously updates the TE database. The path computation engine performs path computation of a particular layer as requested by using the TE database as shown in FIG. 7.

Figure 7:
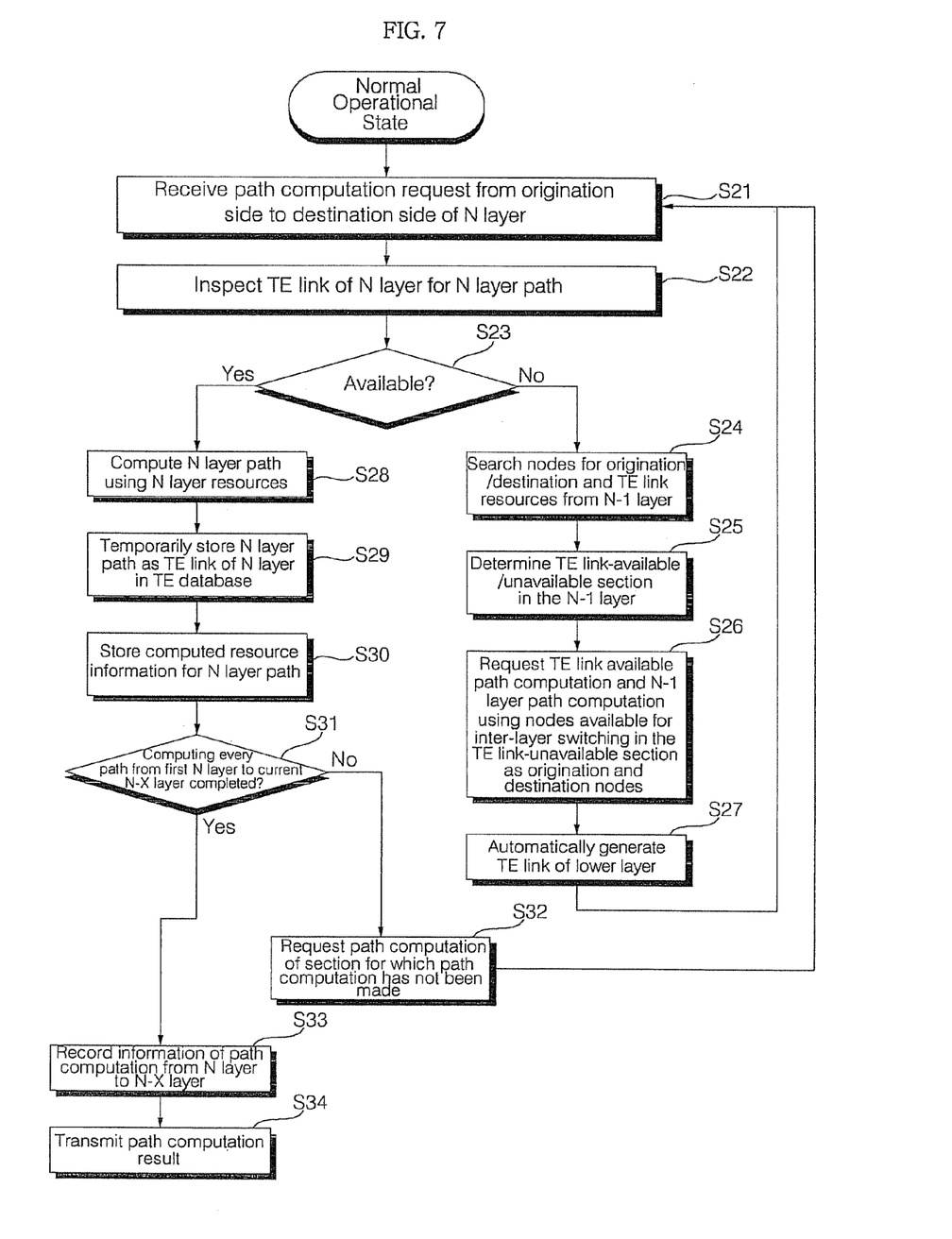
FIG. 7 is a flow chart illustrating the process of a method for computing a path by using the TE database formed by the computation engine according to an embodiment of the present invention.

FIG. 7 is a flow chart illustrating a procedure of processing a transmission path request of a particular layer based on the TE database with respect to node and link resources of the established multi-layer transport network.

The path computation engine receives a path computation request from an origination side (S) to a destination side (D) with respect to a particular N layer (S21). The path computation engine inspects TE link resources of the N layer to establish an N layer path with reference to the TE database (S22). Available TE link resources of each layer may be affected according to the TE link resources allocated by the operator to each layer or a path status established in a current layer.

If the resources of the N layer are not available (S23), the path computation engine searches whether node and link resources of an N−1 layer, a lower layer of the N layer, are available by using the TE database (S24).

The path computation engine determines a TE link-available section and a TE link-unavailable section based on the search result (S25). Among sections, the TE link-available section is a section whose path can be computed by the path computation engine. The path computation engine computes the path of the TE link-available section.

If there is a TE link-unavailable section, the path computation engine computes the TE link-unavailable section, and requests N−1 layer path computation using nodes available for inter-layer switching in the TE link-unavailable section as a new origination node and a new destination node (S26). The path computation engine may search an inter-layer switching-available node existing in the TE link-unavailable section from the N−1 layer with reference to the TE database. As the request for the transmission path of the N−1 layer, the lower layer of the N layer, may be processed as a recursively new transmission path request, a TE link of the lower layer is automatically generated (S27).

Meanwhile, when TE link resources with respect to the N layer are available (s22), the path computation engine computes and establishes a path by using the available TE link resources (S28). The established path is temporarily stored as a new TE link in the TE database of the N layer (S29), and the computed path is stored by layers so as to be transmitted as a result of the computation of the N-layer path, the first path request (S30).

The path computation engine recursively repeats path computation and path request of the next lower layer until when all the paths of the N layer, the first request layer, are divided to the N layer or the lower layer and computed.

In other words, until computation of all the initially computation-requested paths is completed (S31), the path computation engine repeatedly recursively computes paths of the next lower layers (N−1, N−2, . . . , N−X) over sections of the layers that have not been computed, or repeatedly performs path request (S32).

When computation of all the configuration path of the paths for which computation was initially requested is completed, the path computation engine records information regarding the paths computed by layers from the N layer to the N−X layer, as results (S33). The path computation engine transmits the recorded path computation results to the side that has requested the path computation (S34).

The transferred path computation information is as follows.

The number of layers required for inter-layer call request: X

Path computation information of layers from 'N layer' to 'N−X layer': A list of resource information constructing the path including the corresponding layer node information or node and TE link information.

According to the procedure as described above, in the multi-layer transport network including multi-layer transmission resources, required resources of each layer is automatically allocated without a passive intervention of the operator or previous allocation of resources to each layer, whereby requested resources can be automatically allocated to a requested service at a desired time. In addition, the practical method for providing diverse services ranging from an optical/TDM dedicated line service to a VPN service most effectively and quickly can be presented.

In the embodiment of the present invention, the above-described method can be implemented as codes that can be read by a processor in a processor-readable medium. The processor-readable medium includes all kinds of recording devices in which data that can be read by the processor is stored. For example, the processor-readable medium may include a ROM, a RAM, a CD-ROM, a magnetic tape, a floppy disk, an optical data storage device, and the like. The processor-readable medium may be distributed to a computer system connected via a network, in which codes that can be read by the processor in the distributed manner is stored and executed.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for computing a recursive path in a multi-layer transport network, the method comprising:
    receiving a path computation request for a transmission service of an N layer in the multi-layer transport network including at least two layers;
    searching a traffic engineering (TE) link resource available in an N−1 layer and computing a path of the TE link available section when the TE link resource of the N layer required for computing the computation-requested path is insufficient; and
    requesting computation of a path using inter-layer switching available nodes present in a TE link unavailable section of the N−1 layer as an origination node and a destination node when there is the TE link-unavailable section in the N−1 layer,
    wherein a path computation of a next lower layer and a path computation request are repeatedly conducted recursively until when all the path computations included in the N layer path computation request is completed.

2. The method of claim 1, further comprising:
    transmitting the number of layers required for computation of all the paths and path computation information of each layer as computation results when computation of all the requested paths is completed.

3. The method of claim 2, wherein the path computation information of each layer is resource information list including TE link resource information or node information for computation of a path of a section of a corresponding layer.

4. The method of claim 1, further comprising:
    generating node state information including information about an inter-layer switching available node among nodes existing in each layer constituting the multi-layer transport network and priority information assigned to the inter-layer switching available node;

generating link state information including information about TE link resources set for nodes existing in each layer; and advertising the generated node state information and link state information to neighbor nodes.

5. The method of claim 4, wherein the advertising comprises advertising the inter-layer switching available node among the nodes existing in each layer by using the same node ID, to every switching-available layer.

6. The method of claim 4, further comprising:
advertising the changed information to neighbor nodes when the node state information or the link state information changes.

7. The method of claim 4, further comprising:
receiving the node state information and link state information advertised in the multi-layer transport network; and constructing a TE database for a path computation corresponding to the received node state information and link state information.

8. The method of claim 7, wherein the TE database includes ID information assigned to a node in the multi-layer transport network, information about switching capability of the inter-layer switching available node, and information corresponding to priority given to the inter-layer switching available node.

9. The method of claim 8, wherein the information about the switching capability of the inter-layer switching available node includes at least one of PSC (Packet Switching Capability), L2SC (Layer 2 Switching Capability), TDMC (Time Division Multiplexing Switching Capability), LSC (Lambda Switching Capability), and FSC (Fiber Switching Capability) information.

10. The method of claim 7, wherein the path computing comprises;
searching an available TE link resource of the N-1 layer with reference to the TE database; and
computing a path of a certain section in the N-1 layer by using the searched TE link resource.

11. The method of claim 10, wherein the path computation requesting comprises;
computing a TE link-unavailable section when the searched TE link resource is not sufficient for path computation;
searching nodes having an inter-layer switching capability existing in the TE link-unavailable section with reference to the TE database; and
requesting computation of a path of the N-1 layer using the searched nodes having the inter-layer switching capability as a new origination node and destination node.

12. An apparatus for recursive path computation in a multi-layer transport network including at least two layers, the apparatus comprising:
a traffic engineering (TE) database including ID information assigned to a node of the multi-layer transport network, information about switching capability of a node available for inter-layer switching, and information about a priority level assigned to the inter-layer switching-available node; and a path computation engine configured to search a TE link resource of the N layer with reference to the TE database when a path computation request for a transmission service of the N layer is received, and to recursively repeat a path computation of a next lower layer and a path computation request until all the path computations included the N layer path computation request are completed when the searched TE link resource of the N layer is insufficient for the N layer path computation.

13. The apparatus of claim 12, wherein the path computation engine constructs the TE database when the path computation engine receives node state information including information about an inter-layer switching available node, among nodes existing in each layer constituting the multi-layer transport network, and priority information assigned to the inter-layer switching available node, and link state information including information about TE link resources set for nodes existing in each layer.

14. The apparatus of claim 12, wherein the path computation engine searches a TE link resource available for the N-1 layer and computes a path of the TE link-available section when the TE link resource of the N layer required for the N layer path computation is not sufficient;
requests a path computation using inter-layer switching-available nodes existing in a TE link-unavailable section of the N-1 layer as an origination node and a destination node when there is the TE link-unavailable section in the N-1 layer; and
repeats a path computation of a next lower layer and a path computation request until all the path computations included in the N layer path computation request are completed.

15. The apparatus of claim 14, wherein the path computation engine transmits the number of layers required for the computation of all the paths and information about the path computation of each layer, as path computation results, when all the path computations of the N layer are completed.

16. The apparatus of claim 15, wherein the path computation information of each layer is resource information list including TE link resource information or node information for computation of a path of a section of a corresponding layer.

17. The apparatus of claim 14, wherein the path computation engine searches an available TE link resource of the N-1 layer with reference to the TE database, and computes a path of a certain section of the N-1 layer by using the searched TE link resource.

18. The apparatus of claim 17, wherein the path computation engine computes a TE link-unavailable section when the searched TE link resource is not sufficient for path computation, searches nodes having an inter-layer switching capability existing in the TE link-unavailable section with reference to the TE database, and requests computation of a path of the N-1 layer using the searched nodes having inter-layer switching capability as a new origination node and destination node.

\* \* \* \* \*